US008380969B2

(12) United States Patent
Brown et al.

(10) Patent No.: US 8,380,969 B2
(45) Date of Patent: Feb. 19, 2013

(54) METHOD OF RETAINING CRUCIAL THIN CLIENT SYSTEM SETTINGS UNUSED BY THE BIOS IN THE MEMORY SPACE OF A STORAGE DEVICE CONTAINING THE BIOS

(75) Inventors: Norman P. Brown, Tomball, TX (US); Ronald T. Truong, Houston, TX (US); William R. Whipple, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1021 days.

(21) Appl. No.: 12/237,201

(22) Filed: Sep. 24, 2008

(65) Prior Publication Data

US 2010/0077190 A1 Mar. 25, 2010

Related U.S. Application Data

(60) Provisional application No. 61/082,256, filed on Jul. 21, 2008.

(51) Int. Cl.
*G06F 15/177* (2006.01)
*G06F 9/45* (2006.01)
*G06F 9/44* (2006.01)

(52) U.S. Cl. ............................ 713/2; 717/151; 717/168
(58) Field of Classification Search ...... 713/2; 717/168, 717/151
See application file for complete search history.

(56) References Cited

U.S. PATENT DOCUMENTS

| | | | |
|---|---|---|---|
| 6,802,009 | B1 | 10/2004 | Godwin |
| 2003/0229768 | A1* | 12/2003 | Kawano et al. ............... 711/165 |
| 2004/0255283 | A1* | 12/2004 | Rudelic et al. ............... 717/151 |
| 2005/0010913 | A1* | 1/2005 | Chen ............................ 717/168 |
| 2007/0208929 | A1* | 9/2007 | Lin et al. .......................... 713/2 |
| 2008/0072029 | A1* | 3/2008 | Yu et al. ............................ 713/1 |

* cited by examiner

*Primary Examiner* — Thomas Lee
*Assistant Examiner* — Terrell Johnson

(57) ABSTRACT

A system comprises a first non-volatile storage device that contains an operating system. The system also comprises a second non-volatile storage device that contains basic input/output system (BIOS) code and at least one parameter used by the operating system or by a network interface, and not by the BIOS code.

15 Claims, 2 Drawing Sheets

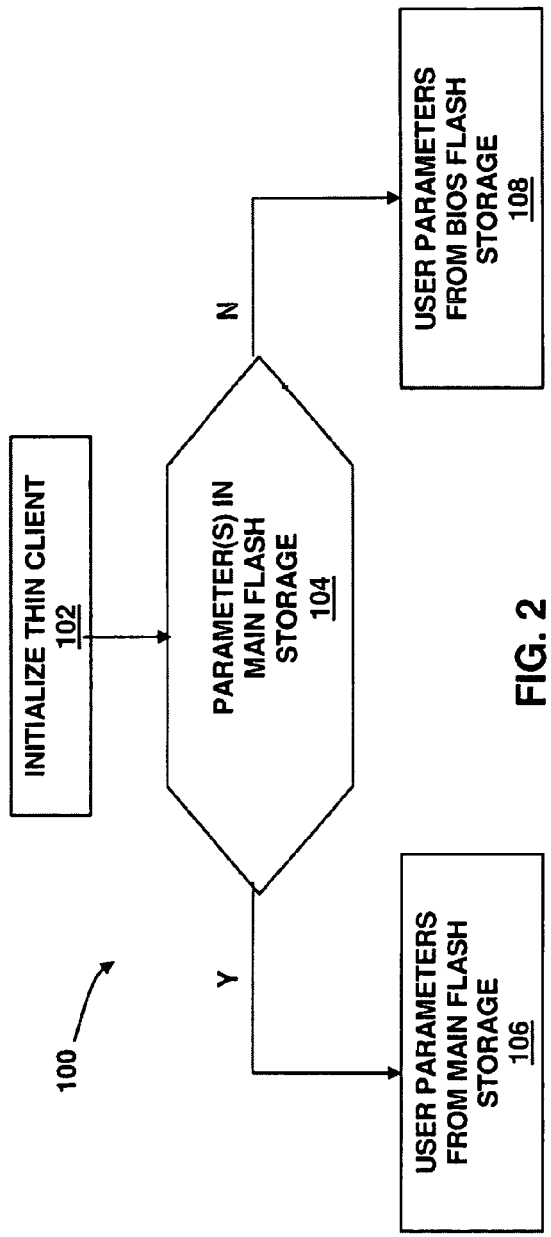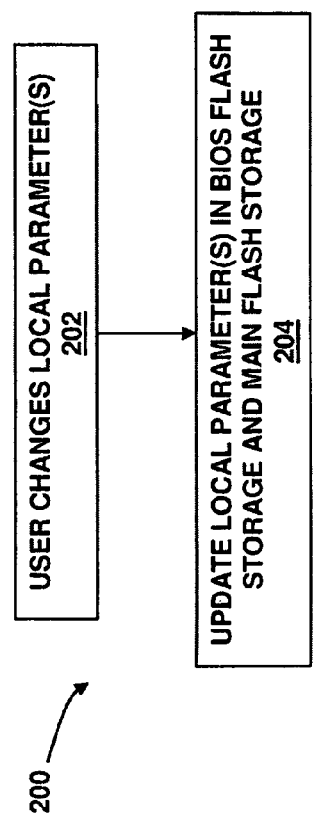

METHOD OF RETAINING CRUCIAL THIN CLIENT SYSTEM SETTINGS UNUSED BY THE BIOS IN THE MEMORY SPACE OF A STORAGE DEVICE CONTAINING THE BIOS

CROSS-REFERENCE TO RELATED APPLICATIONS

This Application claims the benefit of U.S. Provisional Application Ser. No. 61/082,256, filed Jul. 21, 2008, titled "Method To Retain Crucial Thin Client System Settings" which is hereby incorporated by reference herein as if reproduced in full below.

BACKGROUND

A "thin client" is a reduced-functionality computer. A thin client typically does not have as much memory as other computers and/or may have a slower processor. A thin client may fewer input/output ports than other computers. No specific limitations, however, are imposed on a thin client in this disclosure.

A "thin client" is a reduced-functionality computer. A thin client typically does not have as much memory as other computers and/or may have a slower processor. A thin client may comprise fewer input/output ports than other computers. No specific limitations, however, are imposed on a thin client in this disclosure.

BRIEF DESCRIPTION OF THE DRAWINGS

For a detailed description of exemplary embodiments of the invention, reference will now be made to the accompanying drawings in which:

FIG. 2 shows a method in accordance with various embodiments; and

FIG. 3 shows another method in accordance with various embodiments.

NOTATION AND NOMENCLATURE

Figure 1:
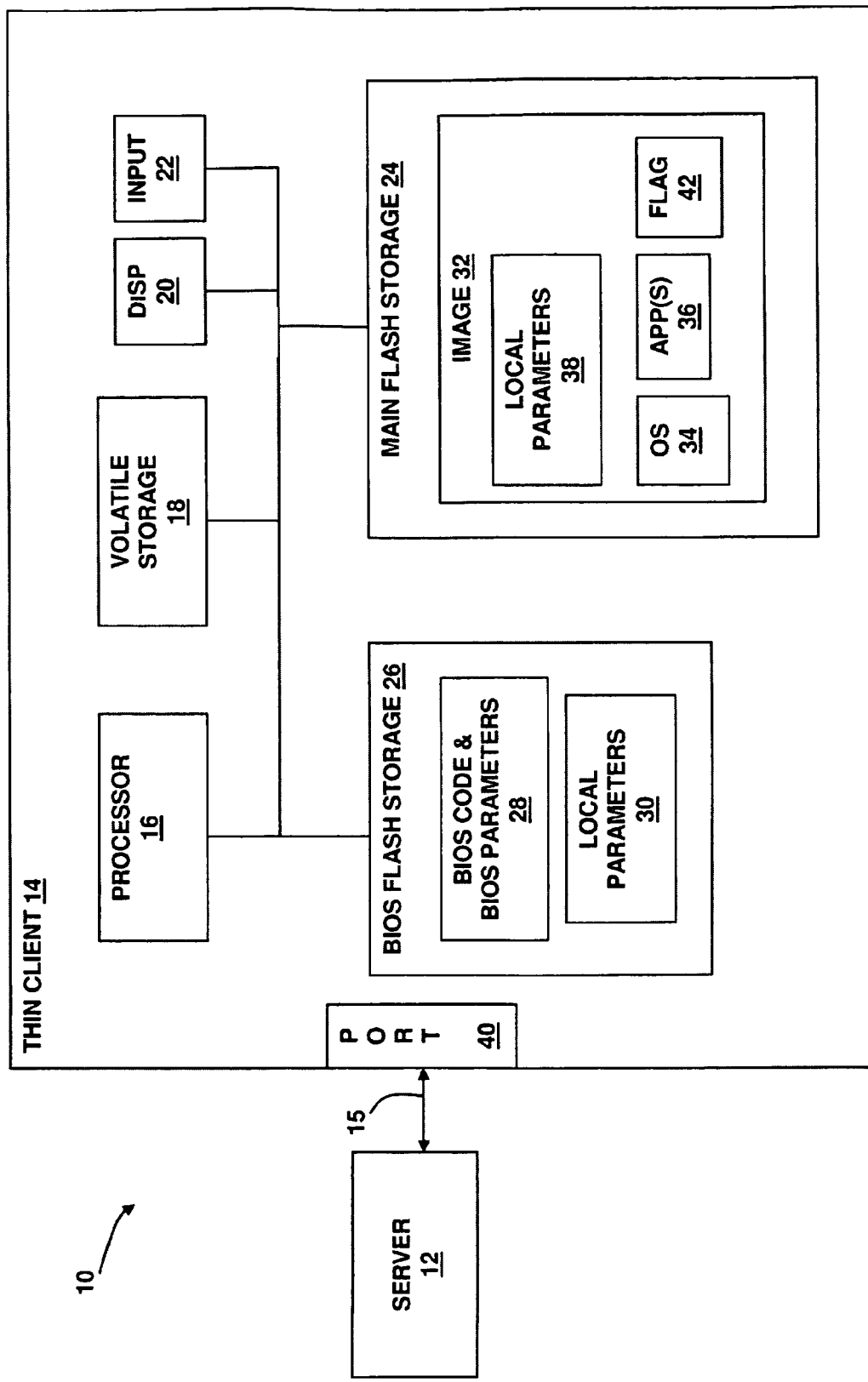
FIG. 1 shows a system in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring to FIG. 1, a system 10 is shown in accordance with various embodiments. As shown, system 10 comprises a server 12 communicatively coupled to a thin client 14 via a network-connection 15. The system 10 depicted in FIG. 1 implements server-based computing in that most of the processing power is implemented in the server 12. The thin client 14 receives pixel data from the server and displays the pixel data and provides user inputs to the server. From the point of view of a user sitting in front of thin client 14, the thin client 14 appears to be processing the data and executing the applications at the request of the user. Instead, however the processing power is exclusively or mainly in server 12.

Thin client 14 includes a processor 16 coupled to a volatile storage 18, a display 20, an input device 22, a first non-volatile storage 24, a second non-volatile storage 26, and a network port 40 (which couples to server 12 via communication link 15). The storages 24 and 26 are separate devices in at least some embodiments. Because some or all of the processing power is instilled in the server 12, the processor power (e.g., processor speed) and memory storage requirements of the thin client 14 are not nearly as great as they would be as if the thin client 14 was executing the applications and performing all processing locally instead of the server 12. No specific limitations are imposed on the processing power and memory storage requirements of the thin client 14.

The volatile storage 18 preferably comprises any suitable type of volatile storage such as random access memory (RAM). The input device 22 may be any one or more of a mouse, a trackball, or a keyboard.

The first non-volatile storage device 24 comprises any suitable type of non-volatile storage such as flash memory. Similarly, the second non-volatile storage device 26 also comprises any suitable type of non-volatile storage such as flash memory. The type of storage medium used to implement the first and second non-volatile storage devices 24, 26 may or may not be the same.

The difference between the first non-volatile storage device 24 and the second non-volatile storage device 26 has to do with the contents of the storage devices. In accordance with various embodiments the first non-volatile storage device 24 contains an operating system image 32 containing an operating system 34 (OS) and one or more applications 36 that run under the operating system 34. Any portion of the image 32 can be updated or replaced by re-writing the entire first non-volatile storage device 24 (a process referred to as "flashing"). The first non-volatile storage device is referred to as a "main Flash storage" for simplicity in this disclosure.

The second non-volatile storage device 26 contains basic input/output system (BIOS) code and BIOS parameters 28 and local parameters 30. The BIOS code comprises code that is executed by processor 16 and performs various low-level functions such as power-on self-test, displaying information on display 20, etc. The BIOS code uses one or more BIOS parameters contained within the BIOS code and BIOS parameters storage 28. Because the thin client's BIOS code is stored on the second non-volatile storage device 26, the second non-volatile storage device is referred to for purposes of this disclosure as a "BIOS Flash storage."

In accordance with various embodiments, the operating system 34 uses one or more parameters for its execution. Such parameters may, for example, be used by the thin client to establish and perform network connectivity to the server 12 via network port 40. Such parameters are referred to herein as network/OS parameters 30 or "local parameters." Such local parameters preferably are stored in the BIOS Flash storage 26 (e.g., in a system management BIOS (SMBIOS) table) although the local parameters are used by the OS stored in the main Flash storage 24. In some embodiments, the reason for this physical separation of network/OS parameters 30 from the OS 34 is that if the parameters 30 were stored on the main Flash storage 24 and the main Flash storage 24 was to have its image re-flashed, all such local parameters would be lost. By storing the local parameters 38 in the BIOS Flash storage 26, the local parameters 30 preferably survive a re-flash of the main the flash storage 24.

In accordance with the preferred embodiments, the local parameters 30 comprise any one or more of a computer name, static internet protocol (IP) address, and an encryption key (e.g. WEP key). In the preferred embodiments, the local parameters 30 are used by the OS 34 for its execution and or for network connectivity, and are not used by the BIOS code.

In various embodiments, the image 32 in the main Flash storage 24 also contains a copy of the currently used local parameters (designated as local parameters 38). As such, as the user of the thin client 14 creates and changes the local parameters, the local parameters 38 are changed on the main Flash storage 24 as well as the BIOS Flash storage 26.

During initialization (e.g., boot up) of the thin client 14, the BIOS code (which contains initialization routines) preferably determines whether the main Flash storage 24 contains the local parameters 30. If the main Flash storage 24 has been re-flashed since the last initialization of the thin client 14, the local parameters 38 in the main Flash storage 24 will preferably be set to a pre-determined value (e.g., all zeroes) to designate to the thin client's initialization routine that the entire main Flash storage 24 has been re-flashed and the local parameters 38 stored on the main Flash storage 24 have been lost. As a result of determining that the OS image 32 on the main Flash storage 24 does not have any local parameters 38, the initialization routines within the BIOS code would then copy the local parameters 30 stored on the BIOS Flash storage 26 to the main Flash storage 24 so that the BIOS Flash storage's local parameters 30 can be used by the thin client. In this way, even a re-flashing of the main Flash storage device 24 in the thin client 14 does not cause the thin client's local parameters to be lost.

In one embodiment, the initialization routine within the BIOS code determines whether the main Flash storage device 24 contains the local parameters by examining the storage locations within the main Flash storage device 24 which normally contains the local parameters (local parameter storage 38). If that storage contains a predetermined value (e.g., all zeroes), then it is determined that the local parameters are not present. If the bit pattern within the local parameter storage area 38 in the main Flash storage 24 is not that particular determined value, then the BIOS code determines that valid local parameters 38 are in fact present on the main Flash storage device.

In other embodiments, a flag 42 (which may be a single bit or multiple bits) is also provided on the main Flash storage 24 to designate whether local parameters are stored in the main Flash storage 24 or not. Any time a user updates or changes a local parameter 38, in addition to updating the local parameters 38 in the main Flash storage 24, the thin client also sets a flag 42 to designate that the main Flash storage 24 in fact contains valid local parameters 38. However, during a re-flash operation of the main Flash storage 24, the flag bit (or bits) 42 are cleared as part of the new image 32 to be loaded into the main Flash storage 24. Consequently, during the subsequent initialization of the thin client 14, the flag 42 will be read as being cleared thereby designating that there are no valid local parameters 38 on the main Flash storage 24.

In other embodiments, an agent in the OS 34 determines whether the local parameters 38 in the OS should be synchronized with the local parameters 30 stored in the BIOS Flash storage 26. On boot up, the agent in the OS examines its configuration storage (OS registry or configuration files) and determines if the local parameters 38 match those stored in the BIOS Flash storage 26 (e.g., in the SMBIOS table). If the local parameters 30 in the BIOS Flash storage are different than the local parameters 38 in the main Flash storage 24, the main Flash storage 24 is updated. On shutdown of the system 10, the opposite occurs. That is, if the local parameters 38 in the main Flash storage 24 is different than the local parameters 30 in the BIOS Flash storage 26, the OS agent stores a copy of the OS' local parameters 38 in the BIOS Flash storage 26 (e.g., in the SMBIOS table).

FIG. 2 illustrates a method 100 for the initialization of the thin client 102. At 102, the thin client preferably is initialized or is caused to begin initialization. This action may be triggered by a user pressing a button on the thin client 14. At 104, the initialization routines within the thin client's BIOS code determine whether a network/OS parameter is provided in the main Flash storage 24. As described above, this determination 104 can be performed in any one of a multiple way such as by determining whether a pre-determined bit pattern is present in local parameter storage 38 on the main Flash storage 24 or whether the flag 42 is clear. If valid local parameters 38 are found on main Flash storage 24, then at 106, the local parameters 38 from the main Flash storage 24 preferably are used during run-time of the thin client. However, if the local parameters 38 are not found on the main Flash storage 24, then at 108 the local parameters 38 are used from the BIOS Flash storage 26 during run-time of the thin client 14. The determination in 104 preferably occurs during or shortly after the initialization of the thin client 102.

FIG. 3 illustrates a method of the operation of the thin client when a user changes a local parameter. At 202, a user changes the local parameter via input device 22 and display 20. The user may change any one or more of the computer name, static IP address, or WEP key as noted above. As the updates are made, both the local parameter storage 38 in the main Flash storage 24 and the local parameter storage 30 in the BIOS Flash storage 26 are updated (204). In some embodiments, an operating system contains a management agent (e.g., executable code) that lets a user, view, access and change the local parameters. As part of that management agent or a separate agent that detects the execution of the management agent, functionality can be built into the thin client to update the local parameter storage whenever the management agent is executed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A system, comprising:
a first non-volatile storage device that contains an operating system;
a second non-volatile storage device that contains basic input/output system (BIOS) code and at least one parameter used by the operating system or by a network interface, and not by the BIOS code;

whether the first non-volatile storage device includes a value indicative of whether the at least one parameter from the second non-volatile storage device is to be copied from the second non-volatile storage device into the first non-volatile storage device for use by the operating system or network interface.

2. The system of claim 1 wherein the at least one parameter is at least one of a computer name, an encryption key, and a network address.

3. The system of claim 1 wherein the at least one parameter comprises a plurality of parameters including at least a computer name, an encryption key, and a network address.

4. The system of claim 1 wherein the value is a flag.

5. The system of claim 4 wherein the at least one parameter is copied from the second non-volatile storage device into the first non-volatile storage device upon system initialization.

6. The system of claim 1 further comprising a user input device coupled to the first and second non-volatile storage devices, said user input device receiving input from a user to update the at least one parameter, and wherein the updated at least one parameter is stored in the second non-volatile storage device.

7. The system of claim 1 wherein the at least one parameter is stored in system management BIOS (SMBIOS).

8. A method, comprising:
   initializing a computer containing a first non-volatile storage device and a second non-volatile storage device, the first non-volatile storage device comprising an operating system, and the second non-volatile storage device comprising basic input/output system (BIOS) code and at least one network or operating system parameter not used by the BIOS;
   while initializing the computer, determining whether the first non-volatile storage device contains the at least one network or operating system parameter;
   using the at least one network or operating system parameter from the first non-volatile storage device based on whether the parameter is present on the first non-volatile storage device; and
   otherwise, using the at least one network or operating system parameter from the second non-volatile storage device.

9. The method of claim 8 further comprising updating the at least one network or operating system parameter in the second non-volatile storage device.

10. The method of claim 8 wherein the at least one network or operating system parameter is at least one of a computer name, an encryption key, and a network address.

11. The method of claim 8 wherein determining if the first non-volatile storage device contains the least one network or operating system parameter comprises determining whether a storage location has a predefined value indicative of the storage location not containing the at least one network or operating system parameter.

12. The method of claim 8 wherein determining if the first non-volatile storage device contains the least one network or operating system parameter comprises reading a flag.

13. A system, comprising:
   means for initializing a computer containing a first non-volatile storage device and a second non-volatile storage device, the first non-volatile storage device comprising an operating system, and the second non-volatile storage device comprising basic input/output system (BIOS) code and at least one network or operating system parameter not used by the BIOS;
   means for determining, during initialization, whether the first non-volatile storage device contains the at least one network or operating system parameter;
   means for using the at least one network or operating system parameter from the first non-volatile storage device based on whether the parameter is present on the first non-volatile storage device; and
   means for otherwise using the at least one network or operating system parameter from the second non-volatile storage device.

14. The system of claim 13 wherein the at least one network or operating system parameter is at least one of a computer name, an encryption key, and a network address.

15. The system of claim 13 further comprising means for updating the at least one network or operating system parameter in the second non-volatile storage device.

* * * * *

UNITED STATES PATENT AND TRADEMARK OFFICE
CERTIFICATE OF CORRECTION

PATENT NO. : 8,380,969 B2  
APPLICATION NO. : 12/237201  
DATED : February 19, 2013  
INVENTOR(S) : Norman P. Brown et al.

Page 1 of 1

It is certified that error appears in the above-identified patent and that said Letters Patent is hereby corrected as shown below:

In the Specifications:

In column 1, line 20, delete "may" and insert -- may comprise --, therefor.

In column 1, lines 23-28, delete "A "thin client" is a reduced-functionality computer. A thin client typically does not have as much memory as other computers and/or may have a slower processor. A thin client may comprise fewer input/output ports than other computers. No specific limitations, however, are imposed on a thin client in this disclosure." and insert -- A thin client may have a non-volatile storage such as Flash memory that contains an operating system image. To update the software on the thin client, the entire operating system image may be replaced with a new operating system image. The process of re-flashing the Flash memory containing the operating system unfortunately may also cause any locally configured settings to be overwritten by the new operating system image. --, therefor.

In the Claims:

In column 6, line 8, in Claim 11, delete "least" and insert -- at least --, therefor.

In column 6, line 14, in Claim 12, delete "least" and insert -- at least --, therefor.

Signed and Sealed this  
Twenty-eighth Day of May, 2013

Teresa Stanek Rea  
*Acting Director of the United States Patent and Trademark Office*